Nov. 25, 1952  W. R. HATHAWAY  2,619,584
LIGHTING FIXTURE FOR ELONGATED TUBULAR LAMPS
Filed Oct. 29, 1947  4 Sheets-Sheet 1
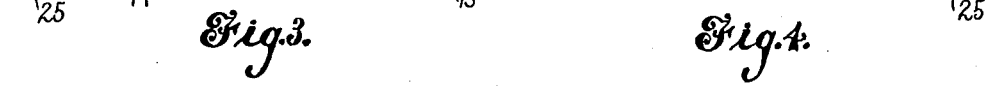
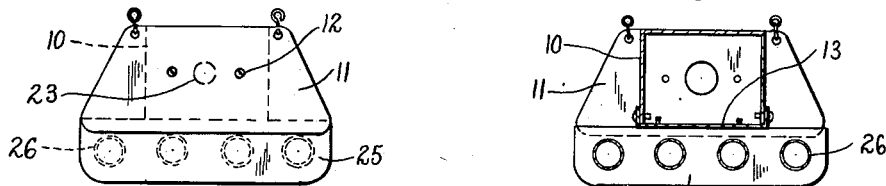
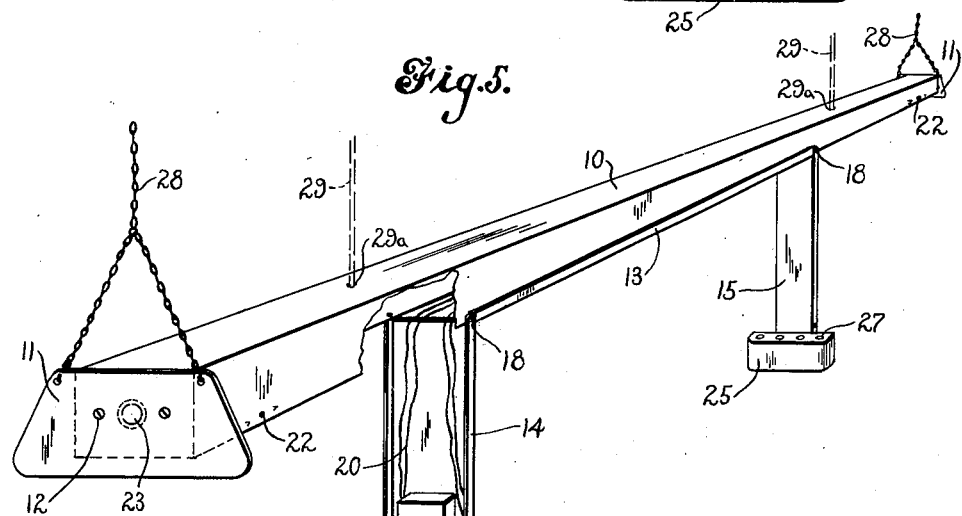
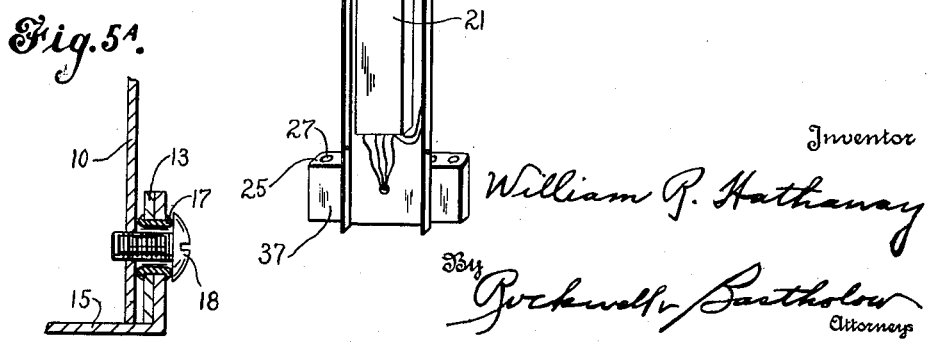
Inventor
William R. Hathaway
By Rockwell & Bartholow
Attorneys Nov. 25, 1952  W. R. HATHAWAY  2,619,584
LIGHTING FIXTURE FOR ELONGATED TUBULAR LAMPS
Filed Oct. 29, 1947 4 Sheets-Sheet 2
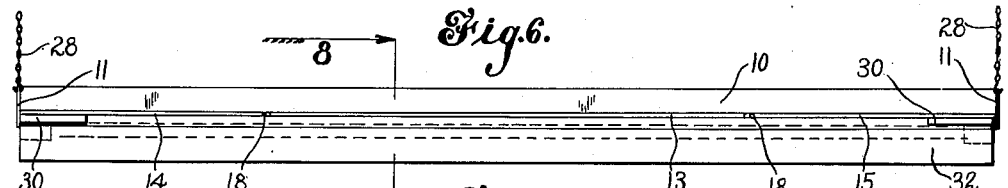
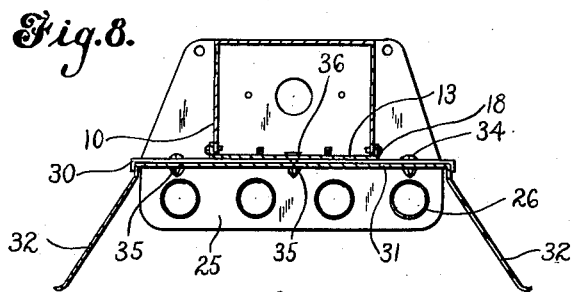
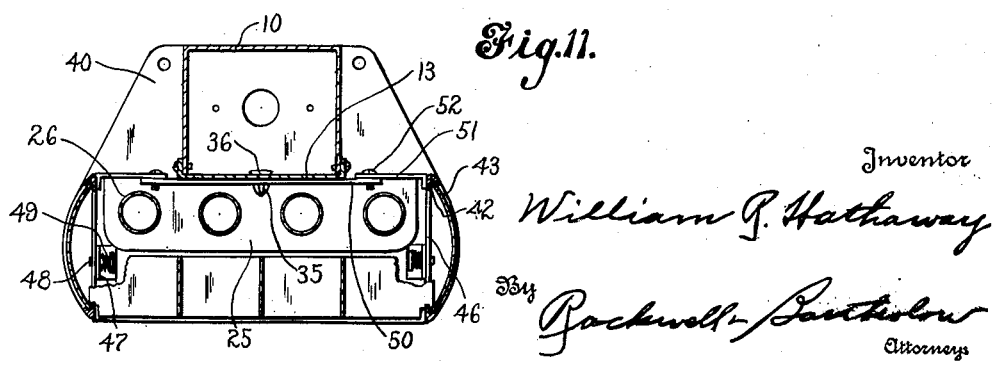
Inventor
William R. Hathaway
By Rockwell-Bartholow
Attorneys

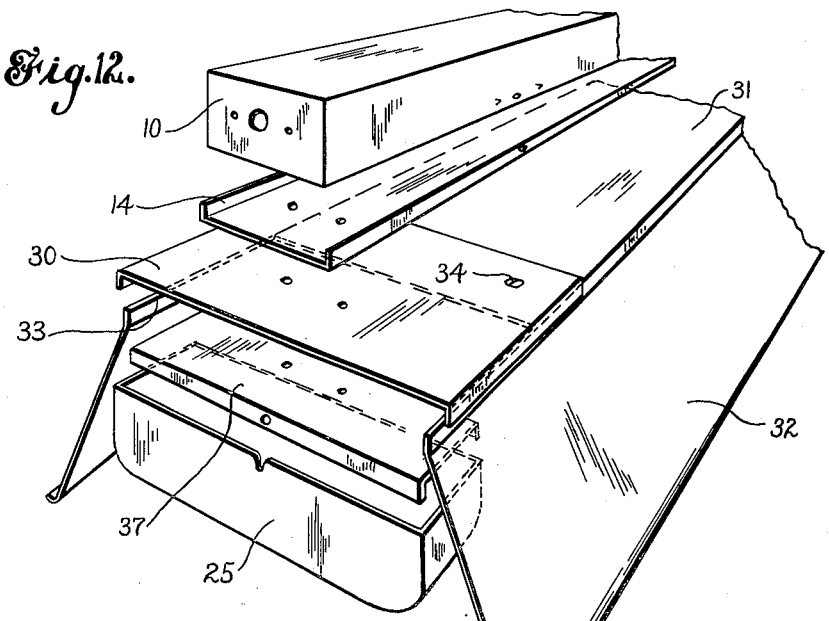
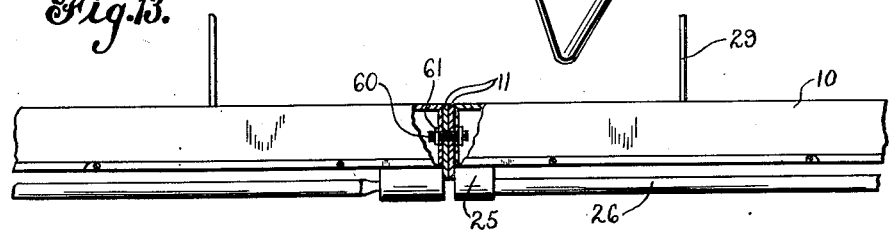
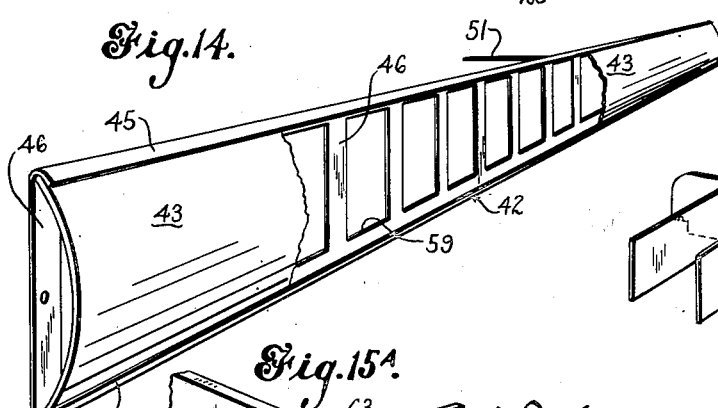
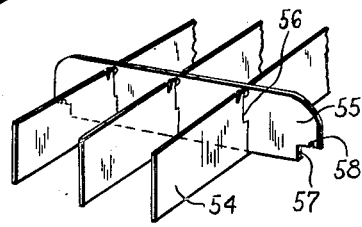
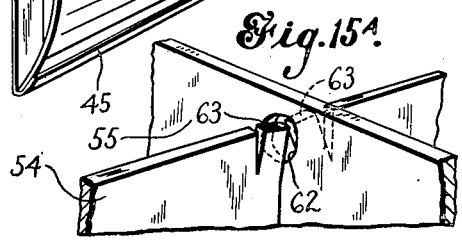

Nov. 25, 1952 W. R. HATHAWAY 2,619,584
LIGHTING FIXTURE FOR ELONGATED TUBULAR LAMPS
Filed Oct. 29, 1947 4 Sheets-Sheet 4
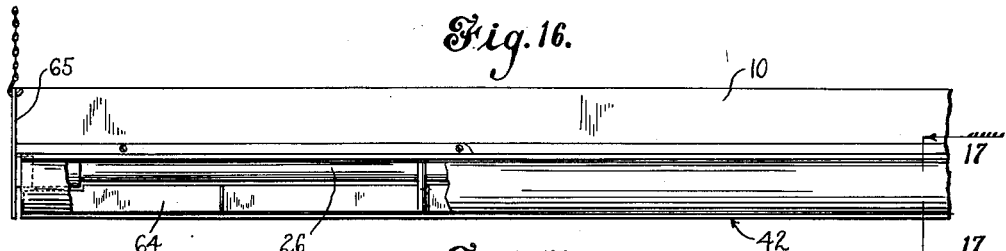
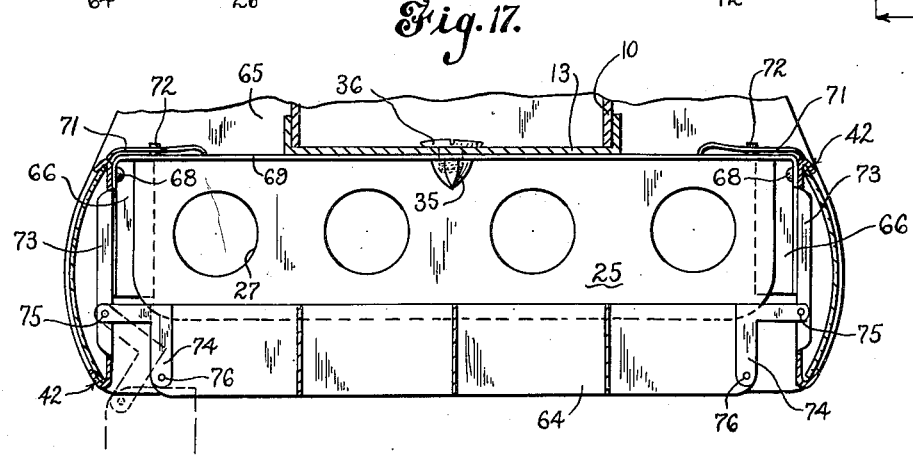
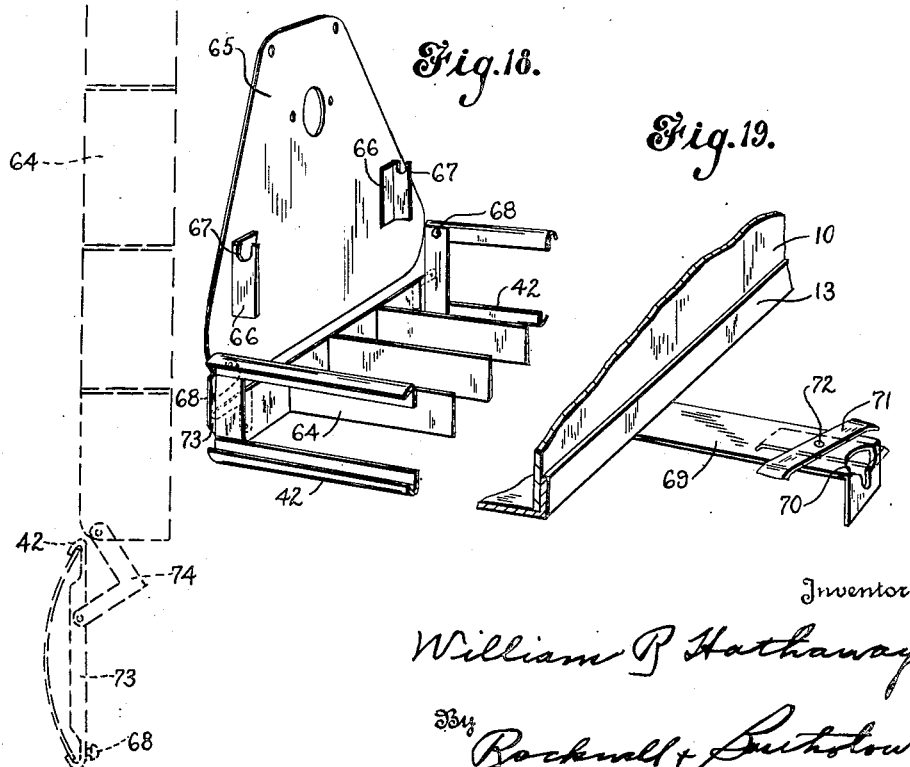
Inventor
William R Hathaway
By Rockwell & Burtholow
Attorneys Patented Nov. 25, 1952

2,619,584

UNITED STATES PATENT OFFICE 2,619,584

LIGHTING FIXTURE FOR ELONGATED TUBULAR LAMPS

William R. Hathaway, West Haven, Conn., assignor to United Advertising Corporation, New Haven, Conn., a corporation of New Jersey Application October 29, 1947, Serial No. 782,759

13 Claims. (Cl. 240—51.11)

This invention relates to lighting fixtures, and, although not limited to this particular use, it is shown as applied to lighting fixtures for so-called cold cathode lighting.

In an installation for cold cathode lighting, the lamp elements are usually in the form of relatively long cylindrical tubes, these tubes commonly being made in eight-foot lengths. The fixture for holding the lamp must, therefore, be relatively long and sufficiently wide to hold a plurality of the lamp tubes which may be employed in groups of two or more. The fixture is, therefore, of relatively large size, and it is, of course, desirable that it be of simple construction, of relatively light weight, and economical to manufacture and assemble.

Also, installations of this character need a certain amount of servicing. It is necessary at times to clean the reflector, so that the fixture should be so constructed that this cleaning operation may be effected without undue inconvenience. Moreover, it is sometimes necessary to gain access to the transformer or ballast and to the wiring, and, as these parts are usually concealed within the fixture, it is desirable that the latter be so constructed that convenient access to these parts is afforded.

It is contemplated by the present invention to provide a light fixture of this character which may be produced as a unitary structure, and which may be readily and easily installed and serviced. Additionally, it is contemplated to provide a lighting fixture unit of very simple construction, and, therefore, relatively economical to manufacture, and it is also contemplated that these units may, if desired, be so constructed that the parts thereof may be readily assembled and disassembled when necessary.

In addition, several types of fixtures are employed. For example, in some instances, such as factory lighting, reflectors are in many instances employed, and the lighting tubes are simply left bare, so that the light will issue therefrom without means to concentrate or reflect the rays. In other instances, reflectors are desired to concentrate to some extent and reflect the rays of light issuing from the lamps, while in still other installations it is desirable to shield the tubes so as to diffuse the rays where a more even spreading or diffusion of light is desired.

The present construction is adapted to all of the above types of fixtures in that it consists of a basic unit comprising a hollow body or channel member to which end housings may be secured for carrying the tubular lamps, and to this basic member may be secured, when desired, a reflector to concentrate the rays or light diffusing or shielding means, so that, regardless of which type of fixture is required, the same basic unit may be employed in each.

One object of the present invention is to provide a light fixture for cold cathode or fluorescent lighting which will be of simple and sturdy construction, and which will be adapted to receive tubular lamps of standard length.

A further object of the invention is to provide lighting fixtures of the character described which are so constructed that the parts may be assembled and the fixture installed with a minimum of effort, and so that ready and convenient access may be had to the wiring and ballast when servicing is required.

A still further object of the invention is to provide a lighting fixture for fluorescent lamps which will be economical to manufacture in that a number of different types of fixtures may be built up upon a basic unit, this unit containing the wiring and ballast and being so constructed that convenient access to the interior of the unit is afforded.

To these and other ends the invention consists in the novel features and combinations of parts to be hereinafter described and claimed.

In the accompanying drawings:

Fig. 1 is a side elevational view of a basic lighting fixture embodying my invention;

Fig. 2 is a bottom plan view thereof;

Fig. 3 is a side elevational view of the fixture shown in Figs. 1 and 2;

Fig. 4 is a sectional view on line 4—4 of Fig. 1;

Fig. 5 is a perspective view of the basic channel unit for housing the wiring and ballast;

Fig. 5$^A$ is a fragmentary sectional view on line 5$^A$—5$^A$ of Fig. 1;

Fig. 6 is a side elevational view of a lighting fixture similar to that shown in Fig. 1, but embodying a reflector;

Fig. 7 is a bottom plan view thereof;

Fig. 8 is a sectional view on line 8—8 of Fig. 6;

Fig. 9 is a side elevational view of a lighting fixture employing shielding or diffusing means for the light rays;

Fig. 10 is a bottom plan view of the fixture shown in Fig. 9;

Fig. 11 is a sectional view on line 11—11 of Fig. 9;

Fig. 12 is an exploded perspective view of the end portion of the lighting fixture shown in Figs. 6 to 8;

Fig. 13 is a fragmentary view showing a pair of fixtures similar to those illustrated in Fig. 1 connected together end to end;

Fig. 14 is a perspective view of the frame for holding the glass-diffusing elements employed in the fixture shown in Figs. 9 to 11;

Fig. 15 is a fragmentary perspective view of a portion of the louver structure of the fixture shown in Figs. 9 to 11;

Fig. 15$^A$ is an enlarged fragmentary view showing the manner of connecting the longitudinal members of the louver structure to the transverse members;

Fig. 16 is an elevational view of the end portion of a fixture of modified form;

Fig. 17 is a sectional view on line 17—17 of Fig. 16;

Fig. 18 is an exploded perspective view showing the end portions of the frame of the fixture illustrated in Figs. 16 and 17; and Fig. 19 is a fragmentary perspective view of the same.

To illustrate one embodiment of my invention, I have shown in Figs. 1 to 5 of the drawings a lighting fixture comprising a base member 10 which is channel shape in form with the open side facing downwardly. To the ends of this member are secured end plates 11 by suitable fastening means, such as screws 12.

The hollow channel-shaped member 10 is closed at its lower side by a closure member comprising the three sections 13, 14 and 15. The sections 14 and 15 are hinged or pivoted to the ends of the section 13 by eyelets 17, and screws 18 (Fig. 5A) pass through these eyelets to secure the section 13 to the member 10. Thus the sections 14 and 15 may be swung downwardly, as shown in Fig. 5, in order to obtain access to the wiring 20 and ballast 21, which is contained in the channel member 10 and carried by the lower closure member consisting of the three sections 13, 14 and 15.

It will be noted that these sections are provided with side flanges which overlap the lower edges of the sides of the channel member 10, and, when the sections 14 and 15 are swung upwardly to closed position, they may be secured in place by screws or like fastening members passing through these flanges and through openings 22 in the sides of the channel member. It will also be understood that the total length of the sections 13, 14 and 15 is equal to that of the base member 10, so that, when the hinged sections 14 and 15 are closed, they will lie snugly within the end plates 11. The channel member 10 may be provided with openings in the ends through which the wires may be led, these openings registering with knock-out plugs 23 in the end plates.

In this form of my invention, housings 25 may be secured to the sections 14 and 15, and within these housings are mounted the lamp sockets (not shown) to receive the end terminals of the tubular lamps 26 through the openings 27 in the usual manner. As illustrated in Figs. 1 and 2, no reflector is employed with this particular unit, the tubular lamps being left "bare," and the unit may be suspended from the ceiling by suitable cords or chains 28, or it may be rigidly secured by a conduit 29 which is in turn secured at 29a to the upper face of the base member or channel member 10.

It will be noted that, in installing and assembling the fixture, the hinged sections 14 and 15 are particularly convenient in that, when swung downwardly, as shown in Fig. 5, the entire lower closure member, which altogether is about eight feet in length, is reduced to a length of four feet, so that it may be readily handled by one person and secured to the channel member 10. Moreover, by removing the tubes 26 from their sockets these end members may be swung downwardly so as to permit access to the wiring and ballast for servicing.

In Figs. 6, 7, 8 and 12 of the drawings, I have shown a lighting fixture which consists of the basic parts previously described in connection with Figs. 1 to 5, and also comprises a reflector to reflect the light from the tubular lamps downwardly. As shown, this unit comprises the basic channel member 10, which, as before, is closed at its lower side by the sections 13, 14 and 15. As shown in the exploded view in Fig. 12, there is secured at the free end of each of the sections 14 and 15 an adapter plate 30, to which plate the end housings 25 are secured. The reflector, as shown more especially in Figs. 8 and 12, is an inverted trough-shaped member having a base 31 and outwardly flaring side walls 32. At its ends, the base portion 31 is cut away, as shown at 33, so as to permit the housings 25 to be placed within the cut-out portion and lie flatly against the adapter plates 30.

The adapter plates are, as stated, secured to the sections 14 and 15, and to the adapted plates are secured the ends of the base 31 of the reflector by screws 34 having acorn nuts 35 thereon. At its central portion, the reflector is secured directly to the central section 13 of the closure member by a similar screw 36. As shown in Fig. 12, the end housings 25 are hollow, and their upper open ends are closed by the bases 37 secured to the housings and likewise secured to the adapter plates 30. The lamp bulbs 26 are, as shown in Fig. 7, removably mounted in sockets in the end housings.

When it is desired to gain access to the wiring and ballast in this form of lighting fixture, the acorn nuts on the bolts 34 and 36 are removed, and the reflector may be detached from the fixture, the bulbs having first been removed from their sockets. The cut-out portion 33 in the reflector permits it to be removed without detaching the housing 25, these housings remaining secured to the adapter plates, so that they may be swung downwardly with the sections 14 and 15 to provide access to the interior of the base of the channel member 10. End plates 11 are also used with this form of my invention by which the device may be suspended by the chains 28.

In Figs. 9, 10, 11, 14 and 15 of the drawings, I have shown a lighting fixture in which the light rays are shielded or diffused so as to effect an even spreading of the light rays. In this form of my invention, the basic channel member 10 is employed as before, the lower portion of which is closed by a closure member consisting of the sections 13, 14 and 15 previously described. To the ends of the members 11 are secured end plates 40 of a form slightly different from the end plates 11, and to the end plates are connected the supporting chains 41. The end housings 25 are secured to the sections 14 and 15, as shown in Figs. 1 to 5 of the drawings.

Extending from one of the end plates 40 to the other at each side thereof adjacent the lower edge is a supporting frame 42, shown in Fig. 14, each of which frames supports a plurality of curved light-shielding or diffusing members 43 of translucent glass or similar material. The frames 42 consist of upper and lower channel members 45 connected together by spaced bars 46, so as to form a rigid frame, and, at the same time, permit the light to pass therethrough as well as to pass downwardly between these frames, as shown in Fig. 11. As will be noted from Fig. 14, the upper and lower edges of the members 43 are retained within the channel members 45.

Secured at the lower edges of the end plates 40 are L-shaped brackets 47 through which a screw 48 may be passed into the end bars 46 of the frames 42, so as to secure these frames in place. A spring 49 may be placed between the head of the screw 48 and the angle plate 47 so as to permit the frames 42 to yield outwardly for a purpose to be described hereinafter.

It may also be necessary to connect the frames 42 at their central portions as well as at their end portions, and for this purpose a strap 50 is secured to the section 13 of the closure member, and members 51 which are welded to the frames 42 are secured to this strap by screws 52. It will be noted that the members 51 are secured to the upper edges of the members 42 or adjacent the upper channels 45. This will permit the members 42 to be sprung apart at their lower ends due to their inherent resilience at the central portion of the fixture, while the springs 49 will permit the supporting frames 42 to be sprung apart at their ends.

A baffle frame or louver structure is mounted between the frames 42 below the lamp bulbs or the tubular lamps 26, as shown in Fig. 11, this structure extending substantially from one end plate to the other below the end housings 25. This structure comprises flat longitudinal members 54 and transverse members 55, these members being notched out and nested together, as shown at 56 in Fig. 15. It will be noted that the members 55 are cut away at each end, as shown at 57, and a small notch 58 provided in this cut-away portion. These notches 58 are adapted to receive the lower edges 59 of the openings in the frame 42 between the bars 46 so as to hold the baffle in place. It has already been explained that the frames 42 may be sprung apart at their ends due to the springs 49, and their lower edges may be sprung apart at their central portion due to the resilience of the frames. They can, therefore, be sprung apart sufficiently far to permit the baffle or louver structure to be inserted between them, and, thereafter, when the supporting frames 42 return to their normal positions, ends due to the springs 49, and their lower edges 59 and thus support the baffle structure in place.

When it is desired to obtain access to the channel member 10, the frames 42 are sprung apart and the baffle structure removed. The tubular lamps are then removed from their sockets, and the sections 14 and 15 may be swung downwardly between the frames 42 for servicing, as shown in Fig. 5.

In Fig. 13 of the drawings, I have illustrated the manner of securing two of the lighting fixtures together end to end. When this is done, a nipple 60 is inserted through the openings 23 in the end plates 11 and the registering openings in the channel members 10, and nuts 61 threaded upon this nipple secure the sections rigidly together. The hinging of the sections 13 and 14 permits convenient access to the channel members 10 to permit this connection to be made.

The members of the louver structure may be secured together in a convenient and economical manner, as shown in Fig. 15A. For this purpose, the transverse members 55 of the louver structure are provided with openings or recesses 62 in their upper edges, and the adjacent corners of the longitudinally extending members 54 are staked or displaced into these openings, as shown at 63. This, together with the notches 56, binds the members together so as to form a rigid frame.

In Figs. 16 to 19 of the drawings, I have shown a further modification of the lighting fixture shown in Figs. 9 to 15. In this form of my invention, the frames 42 which carry the light-shielding or diffusing members are secured to the end plates in a slightly different manner, and the louvers are hinged to these frames, so that, when access to the lamps is desired, one of the frames 42, together with the louvers, may be swung downwardly as illustrated in dotted lines in Fig. 17.

As shown more especially in Fig. 18, the end plates 65 are provided with angle brackets 66, each of which has a slot 67 in which is adapted to be received one of the several rivets or screws 68 secured to the frames 42. Adjacent the central portion of the fixture, a strap 69 is secured to the section 13 of the cover of the channel member 10, and, as shown in Fig. 19, this strap is also provided with a keyhole slot 70 to receive another of the screws or rivets 68. Thus, as will be apparent, the side frames may be attached to the end plates 65 by passing the heads of the screws through the upper ends of the slots 67 and 70, and then drawing the frame downwardly, the heads of the screws holding the frames in place. In order to hold the side frames in position, locking members 71 are pivoted to the strap 69 at 72, so that these members may be turned from the full-line position shown in Fig. 19 to the full-line position shown in Fig. 17. In the latter position, they overlie the upper edge of the frames 42 and prevent these frames from moving upwardly.

The baffle frame 64 or louver structure is hinged to the side frames, the latter being provided with flanges 73 through which are received pivot pins 75 of angle-shaped hinges 74, the other ends of which are pivoted to the baffle frame at 76.

As will be obvious, when access to the lamps is desired, one of the members 71 may be swung from the full-line position shown in Fig. 17 to the dotted-line position shown in this figure. The corresponding side frame 42 may then be moved upwardly to detach the screws 68 from the openings 67 and 70. The screws may then be withdrawn from these openings, and the side frame, together with the baffle frame, swung downwardly to the dotted-line position shown in Fig. 17. Thus, access may easily be obtained to the lamps and the louver frame readily installed in position without the actual removal of any screws or bolts.

While I have shown and described some preferred embodiments of my invention, it will be understood that it is not to be limited to all of the details shown, but is capable of modification and variation within the spirit of the invention and within the scope of the claims.

What I claim is:

1. A lighting fixture for fluorescent lamps comprising a hollow elongated base member channel shape in form in cross section, means for supporting said member in inverted position, a closure member detachably secured to said base member at the lower open side thereof, said closure member comprising a section fixed to said base member, and a second section hinged to the first section on an axis transverse to the longitudinal dimention of the base member whereby said second section may be swung about its hinge to permit access to the base member.

2. A lighting fixture for fluorescent lamps comprising a hollow elongated base member channel shape in form in cross section, means for supporting said member in inverted position, a closure member detachably secured to said base member at the lower open side thereof, said closure member comprising a plurality of sections hingedly connected together on an axis transverse to the longitudinal dimension of the base member.

3. A lighting fixture for fluorescent lamps comprising a hollow base member channel shape in form, means for supporting said member in inverted position, a bottom closure member detachably secured to said base member at the lower open side thereof, said closure member comprising a central section detachably secured to said base member, and end sections being hingedly connected to the central section on an axis transverse to the longitudinal dimension of the base member.

4. A lighting fixture for fluorescent lamps comprising a hollow elongated base member channel shape in form in cross section, means for supporting said member in inverted position, a closure member detachably secured to said base member at the lower open side thereof, said closure member comprising a hinged section adapted to swing downwardly from the base member about an axis transverse to the longitudinal dimension of the base member to permit access thereto.

5. A lighting fixture for fluorescent lamps comprising a hollow elongated base member channel shape in form in cross section, means for supporting said member in inverted position, a closure member detachably secured to said base member at the lower open side thereof, said closure member comprising a hinged section adapted to swing downwardly from the base member about an axis transverse to the longitudinal dimension of the base member to permit access thereto, and a transformer mounted on the upper surface of said hinged section within the base member.

6. A lighting fixture for fluorescent lamps comprising a hollow base member channel shape in form, means for supporting said member in inverted position, a closure member detachably secured to said base member at the lower open side thereof, said closure member comprising a section fixed to said base member, a second section hinged to the first section whereby said second section may be swung about its hinge to permit access to the base member, an end housing mounted on said hinged section to support the lamps, and a second end housing carried by the closure member in spaced relation to the first housing.

7. A lighting fixture for fluorescent lamps comprising a hollow base member channel shape in form, means for supporting said member in inverted position, a bottom closure member detachably secured to said base member at the lower open side thereof, said closure member comprising a central section fixed to said base member, end sections hingedly connected to the central section, end housing mounted on the lower surface of said end sections, said housing being provided with lamp supporting sockets, and a reflector detachably secured to the closure member.

8. A lighting fixture for fluorescent lamps comprising a hollow base member channel shape in form, means for supporting said member in inverted position, a closure member detachably secured to said base member at the lower open side thereof, said closure member comprising a central section fixed to said base member, end sections hingedly connected to the central section, end housings mounted on said end sections to support the lamps, a reflector detachably secured to the closure member, said reflector having cut-away portions adjacent its ends, and said housings being disposed within said cut-away portions.

9. A lighting fixture for fluorescent lamps comprising a base member of channel formation, means for supporting said member with its open side facing downwardly, closure means closing the lower side of said member, an adapter plate secured to the closure means at each end thereof, a lamp socket housing secured to each of said adapter plates, a reflector secured to said plates and extending between the end housings, said reflector having a base portion and outwardly and downwardly flaring side walls extending from the base portion, and said base portion being cut away to receive said end housings.

10. A lighting fixture for fluorescent lamps comprising a base member of channel formation, means for supporting said member with its open side facing downwardly, closure means closing the lower side of said member, an adapter plate secured to said closure member adjacent each end thereof, a lamp socket housing secured to each of said adapter plates, a reflector detachably secured to said plates and extending between the end housings, and said closure member comprising a hinged section adapted to swing downwardly to permit access to the interior of the base member.

11. A lighting fixture comprising a body member of channel form, end plates secured at the ends of said member, a shade-supporting frame extending between said end plates at each side of and below said body member, and outwardly yielding means securing said frames to the end plates, said means permitting one of said frames to move outwardly away from the other frame.

12. A lighting fixture comprising a body member of channel form, end plates secured at the ends of said member, a shade-supporting frame extending between said end plates at each side of and below said body member, outwardly yielding means securing said frames to the end plates, said means permitting one of said frames to move outwardly away from the other frame, and a baffle structure extending between and supported by said frames and removable from the fixture when said frames are spread apart.

13. A lighting fixture comprising a body member, end plates secured to said member, shade-supporting frames extending between said end plates at each side of and below the body member, means detachably securing one of said frames to the fixture, and a baffle structure connected to said last-named frame and hingedly connected to the other frame whereby, when said one frame is detached, the baffle member may be swung downwardly to an out-of-the-way position.

WILLIAM R. HATHAWAY.

REFERENCES CITED

The following references are of record in the file of this patent:

UNITED STATES PATENTS

| Number | Name | Date |
|---|---|---|
| 2,031,779 | Ladd | Feb. 25, 1936 |
| 2,241,952 | Lachman | May 13, 1941 |
| 2,291,495 | Beals | July 28, 1942 |
| 2,321,099 | Naysmith | June 8, 1943 |
| 2,365,614 | Winkler et al. | Dec. 19, 1944 |
| 2,396,735 | Leigh | Mar. 19, 1946 |
| 2,474,308 | Frank et al. | June 28, 1949 |

FOREIGN PATENTS

| Number | Country | Date |
|---|---|---|
| 544,692 | Great Britain | Apr. 23, 1942 |
| 587,744 | Great Britain | May 5, 1947 |